(No Model.)

C. A. MASTERSON.
AGRICULTURAL HEATER.

No. 397,195. Patented Feb. 5, 1889.

ATTEST.
Helen Graham,
W. W. Graham

INVENTOR
Carson A. Masterson
By L. P. Graham
his attorney

UNITED STATES PATENT OFFICE.

CARSON A. MASTERSON, OF DECATUR, ASSIGNOR OF ONE-HALF TO JEREMIAH M. DUNCAN, OF LINTNER, ILLINOIS.

AGRICULTURAL HEATER.

SPECIFICATION forming part of Letters Patent No. 397,195, dated February 5, 1889.

Application filed January 14, 1888. Serial No. 260,735. (No model.)

*To all whom it may concern:*

Be it known that I, CARSON A. MASTERSON, of the city of Decatur, county of Macon, and State of Illinois, have invented certain new and useful Improvements in Agricultural Heaters, of which the following is a specification.

It is the object of my invention to steam food for animals and prevent their drinking-water from freezing, and I attain my object by means of the device hereinafter set forth and claimed.

Figure 1:
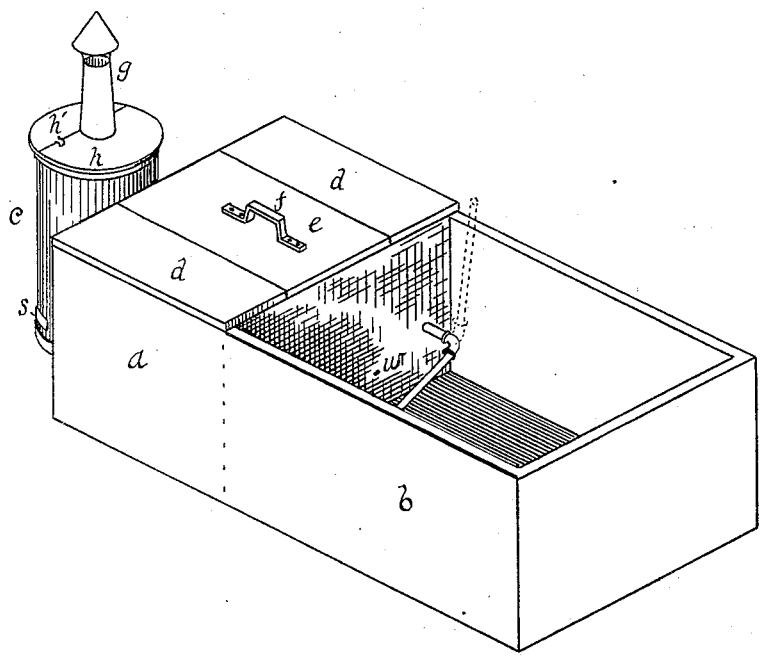
Figure 2:
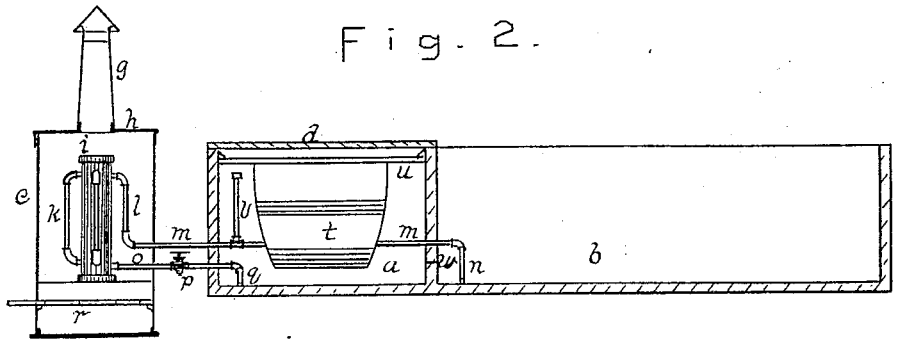

In the drawings accompanying and forming a part of this specification, Figure 1 is a perspective view of my device, and Fig. 2 is a central longitudinal vertical section of the same.

The chamber $a$, in which the food is steamed, contains the food-receptacle $t$. Extending centrally across the upper end of the receptacle $t$ is bar $u$, which is secured to the sides of the chamber and which causes the food-receptacle to remain submerged to the extent indicated in the water of the chamber. The cover $d$ of the steam-chamber has a removable portion, as $e$, to admit access to the food-receptacle, and as a matter of convenience handle $f$ may be provided.

The water-tank is shown at $b$. At $w$ is shown a small opening that connects the water of the tank with the water of the steam-chamber.

The heater comprises the fuel-chamber $c$, provided with grate $r$, register $s$, lid $h$ $h'$, and flue $g$. In the heater is cylinder $i$, which is preferably provided with a series of pipes, as $k$, that connect with the cylinder at top and bottom, and increase the heating capacity of the device. Extending from the lower end of the cylinder into the steam-chamber is pipe $o$, provided with the intermediate cock, $p$. Connecting with the upper portion of the cylinder and extending downward to a point somewhat above pipe $o$ is vertical pipe $l$, and pipe $m$ extends from the lower termination thereof through the steam-chamber and into the water-tank. Pivoting on the ends of pipes $m$ and $o$ at right angles therewith are pipes $n$ and $q$, respectively, which ordinarily rest on the bottoms of their respective tanks, but which may be turned into the position indicated by dotted lines in Fig. 1.

In operation the heated water passes from the upper portion of the cylinder through the steam-chamber and into the water-tank, and is followed by water drawn into the lower end of the cylinder from the steam-chamber. This is the natural tendency of the circulation; but owing to the fact that the opening $w$ is smaller than the pipes, an accumulation of water in the tank $b$ will retard and possibly reverse the circulation to some extent.

When the device is not used for heating purposes, pipes $n$ and $q$ may be thrown upward, carrying their ends above water, and the cylinder be emptied by means of cock $p$. The water-tank may then be used in the ordinary way, and the cylinder will be prepared against freezing.

The natural buoyancy of the food-receptacle will hold it against bar $u$ in the position shown in the drawings, where, being encompassed entirely by water and steam, it will become more readily heated.

The fire is maintained as in an ordinary stove, is at all times accessible, and the heat resulting therefrom is applied directly and most economically to the water of the tanks.

The pipe $v$ connects with pipe $m$ by means of a T-joint, and is provided at its end with a detachable cap. When it is desirable to use the steamer to cook food without heating the water of the drinking-tank, pipe $n$ may be turned up and capped and pipe $v$ be uncapped and turned down. The circulation will then be maintained between the heater, and the steamer, and food may be steamed without materially affecting the temperature of the water in the tank.

I claim as new and desire to secure by Letters Patent—

1. In agricultural heaters, in combination, the steam-chamber $a$, containing the feed-receptacle $t$, the water-tank, the heater, the pipe $m$, having branches $v$ and $n$, the one in the steam-chamber, the other in the water-tank, and the pipe $o$, terminating in the steam-chamber, the water-tank and steam-chamber being separated by a partition having an opening smaller than the pipes, as and for the purpose set forth.

2. In agricultural heaters, in combination, the steam-chamber and the water-tank separated by a partition provided with a small opening, the heater separate from the tank and steam-chamber, and pipes larger in internal diameter than the opening in the partition connecting the heater with the steam-chamber and with the tank, as and for the purpose set forth.

CARSON A. MASTERSON.

Attest:
I. D. WALKER,
J. N. BILLS.